(12) United States Patent
Rodnunsky

(10) Patent No.: US 7,207,277 B2
(45) Date of Patent: Apr. 24, 2007

(54) SYSTEM AND METHOD FOR MOVING OBJECTS WITHIN TWO-DIMENSIONAL SPACE

(75) Inventor: Jim Rodnunsky, Granada Hills, CA (US)

(73) Assignee: Cablecam, LLC, Tulsa, OK (US)

( * ) Notice: Subject to any disclaimer, the term of this patent is extended or adjusted under 35 U.S.C. 154(b) by 0 days.

(21) Appl. No.: 10/605,778

(22) Filed: Oct. 25, 2003

(65) Prior Publication Data

US 2005/0087089 A1   Apr. 28, 2005

(51) Int. Cl.
*B61B 7/00* (2006.01)

(52) U.S. Cl. .................. 104/178; 104/180; 212/76; 212/98

(58) Field of Classification Search ............ 104/112, 104/115, 116, 47, 180, 173.1; 212/76, 77, 212/81, 82, 83, 84, 85, 98, 313, 197; 396/12; 318/649
See application file for complete search history.

(56) References Cited

U.S. PATENT DOCUMENTS

| | | | | |
|---|---|---|---|---|
| 2,035,107 | A | * | 3/1936 | Voss ............................ 212/87 |
| 3,675,794 | A | * | 7/1972 | Ingram et al. ............ 414/138.3 |
| RE27,621 | E | * | 4/1973 | McIntyre ..................... 212/84 |
| 4,372,535 | A | * | 2/1983 | Gibson et al. ............... 254/319 |
| 4,864,937 | A |   | 9/1989 | Kunczynski |
| 5,113,768 | A | * | 5/1992 | Brown ........................ 104/112 |
| 5,224,426 | A | * | 7/1993 | Rodnunsky et al. ........ 104/112 |
| 6,023,862 | A | * | 2/2000 | Sirjola ......................... 37/397 |
| 6,145,679 | A |   | 11/2000 | Walters |
| 6,199,829 | B1 |   | 3/2001 | Brown et al. |

FOREIGN PATENT DOCUMENTS

FR 992069 10/1951

* cited by examiner

*Primary Examiner*—Mark T. Le
(74) *Attorney, Agent, or Firm*—Dalina Law Group, P.C.

(57) ABSTRACT

Embodiments of the invention move objects throughout two-dimensional space by using a support rope that is coupled with both opposing sides of the platform. This rope controls the Y-axis motion and Z-axis motion of the platform and is designated the YZ movement rope. Displacing a portion of the YZ movement rope allows vertical displacement of the platform to be traversed. There is no need for a complex computer control system since the Z-axis displacement is substantially independent of horizontal movement over a coverage area serviced by the platform. In addition, since the rope is commanded from one point, distantly located motors and electrical cables are not required. Many types of useful devices may then be attached to the platform including devices that require external power or devices that possess their own power and are operated via wireless signals.

4 Claims, 7 Drawing Sheets

SYSTEM AND METHOD FOR MOVING OBJECTS WITHIN TWO-DIMENSIONAL SPACE

BACKGROUND OF INVENTION

1. Field of the Invention

Embodiments of the invention described herein pertain to the field of aerial cable rail systems. More particularly, these embodiments enable the movement of objects within two-dimensional space.

2. Description of the Related Art

An aerial cable rail system is a system based on an elevated cable or rope, along which objects are transported. Existing cable rail systems have relied on large fixed structures and/or complex control systems in order to facilitate the movement of objects. These systems fail to satisfactorily achieve the full spectrum of ease of control, compact storage, ease of transport, speed, load bearing, extensibility, maintainability and platform stability.

Any number of coordinate systems can be used in order to describe the path of an object as it moves through space. This document uses the terms Z-axis and Y-axis to denote vertical and horizontal directions respectively.

In U.S. Pat. No. 6,199,829 a device is described that follows a line. There is no mechanism for altering the Z-axis displacement of the mechanism moving along the line. The device is self propelled and is heavy.

In U.S. Pat. No. 5,113,768 a device for transporting a camera along a cable is described. The device must be secure enough to carry not only a camera but also a human photographer. The device is limited in the amount of Z-axis displacement that can be effected.

In U.S. Pat. No. 4,864,937 a point A to point B cable rail is described. The device possesses no means to descend in the Z-axis other than by placement of poles. The poles supporting the structure are placed at fixed heights in order to avoid objects on the ground.

In U.S. Pat. No. 6,145,679 a device is described that uses balloons to provide support for a highline. Items are transported along the highline. The balloons may be raised or lowered but are cumbersome in enclosed environments and stadiums where they would block the view of spectators. In addition, the speed at which items could be transported would be fairly slow since a balloon would have a large surface area and would not be capable of rapid horizontal movement.

SUMMARY OF INVENTION

Embodiments of the invention move objects throughout two-dimensional space by using a rope that is coupled with both opposing sides of a platform which may comprise an object to be moved. This rope controls both the Y-axis motion and Z-axis motion of the platform and is designated the YZ movement rope.

Displacing a portion of the YZ movement rope via the Z-axis motor allows Z-axis of the platform to be primarily traversed although the path may actually be curved as will be explained further in the Detailed Description. Moving YZ movement rope through the sheaves of the system via the Y-axis motor allows the Y-axis of the platform to be primarily traversed although the path may actually be curved. There is no need for a complex computer control system since the Z-axis displacement is substantially independent of Y-axis movement and Y-axis displacement is substantially independent of Z-axis movement over a coverage area serviced by the platform. This means that moving an object away from a given support structure can be accomplished by simply rotating the Y-axis motor although the object may minimally vertically displace in the middle of the path between the support structures to a lesser or greater extent depending upon the amount of rope injected into the system via the Z movement device. This makes for trivial control when the amount of rope in the system is set to follow the path of a stadium for example since the object may be configured to rise and follow the contour of the stadium without operator intervention when the object is near each support structure. Vertical motion of the object is along the Z-axis when the amount of rope to the object is the same from each support structure (i.e., when the object is in the middle of the coverage area) and slightly curved when near the support structures. Since the vertical component of motion may be typically used in the middle and typically deepest part of the coverage area, no horizontal adjustments are typically necessary for this type of vertical motion. In other words, the Z-axis elements in the system control the upward and downward motion of the object although there may be some minimal but predictable horizontal motion, and the Y-axis elements in the system control the motion of the object between support structures although the object may experience some minimal but predictable vertical displacement during this movement.

In addition to trivial control, since the rope may be commanded from one point, distantly located motors and electrical cables are not required. Many types of useful objects may be attached to a mounting platform including devices that require external power or devices that possess their own power and are operated via wireless signals. By moving the platform, the object is therefore moved.

Creating a two axis movement configuration from only one rope driven from a point distantly located from the platform provides the advantages of allowing the motors to be large, power cables to be short and located near a large generator and optional control computer. Maintenance is readily performed in one location. The Z movement device in the system may also utilize a pulley arrangement that multiplies the Z-axis travel or may be constructed from levers, fulcrums, hydraulic or electronic actuators or any other device which can displace rope.

The system may be configured to move objects along the Y and Z axes by using motors mounted at one support point, on or near the ground, to drive the ropes. Embodiments of the invention use motors that connect to a generator, while other embodiments used in areas where power is readily available may use standard utility power. Generators used in embodiments of the invention can be as large as the application requires for achieving the required platform speed. The sheaves employed in the system may contain high speed bearings and are may be configured to capture the rope in order to prevent derailing in order to add a degree of safety to the system. The drive pulleys attached to the motors comprise grooves that grip the rope in order to prevent slippage. Any known means of driving rope may be substituted for grooved pulleys.

For the purposes of this disclosure the use of the word motor signifies a motor connected to a drive pulley or drum winch. This assumption is made for purposes of illustration since it is well known in the art that the motor must drive any of a number of attachments to actually engage and move rope.

The system can be scaled to any size by employing longer ropes and moving the attachment points or support structures.

DETAILED DESCRIPTION

Embodiments of the invention are directed to a System and Method for Moving Objects within Two-Dimensional Space. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Any mathematical references made herein are approximations that can in some instances be varied to any degree that enables the invention to accomplish the function for which it is designed. In other instances, specific features, quantities, or measurements well-known to those of ordinary skill in the art have not been described in detail so as not to obscure the invention. Readers should note that although examples of the invention are set forth herein, the claims, and the full scope of any equivalents, are what define the metes and bounds of the invention.

The term rope as used herein is also meant to refer to a cable or other flexible element that can be adapted for use as described herein. Moreover the use of the term path as related to Y-axis or Z-axis movement should not be limited to a linear path but may include a curved path. For example, elements of the system described as Z-axis or Y-axis related have as their primary control motion associated with their respective axis, although with curved paths, e.g., the Z movement device may actually introduce some Y-axis motion into the moved object and visa versa. Therefore although the terms Z-axis movement and Y-axis movement refer to moving an object primarily in the respective Z-axis and Y-axis, in reality the paths through space may be curved depending on where in the system the moved object is and under what type of movement it is undergoing. For example the Z-path of motion of the platform may be nearly identical to the direction of the Z-axis when the platform is equidistant between the two support structures. The path of the platform when asserting the Z movement device is slightly curved when the platform is near one of the support structures. The path between support structures may be very nearly linear when the amount of rope in the system is set to provide the object with the highest possible height.

Figure 2:
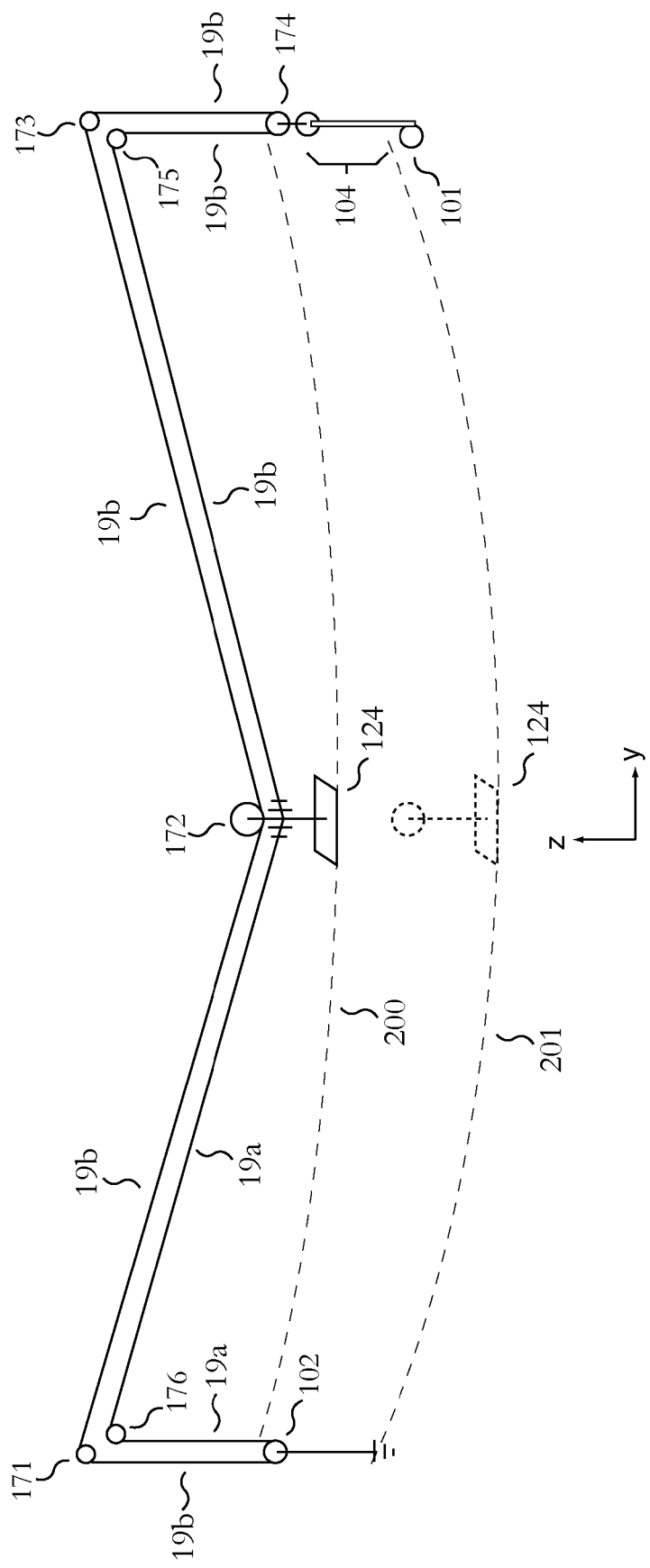
FIG. 2 is a YZ-axis reeving diagram for an embodiment of the invention employing distantly located winches for Y and Z-axis movement and shows two horizontal paths of motion depending on the height of the platform.

Any number of coordinate systems can be used in order to describe the path of an object as it moves through space. This document uses the terms Z-axis and Y-axis to denote vertical and horizontal directions respectively. The upward and downward path of an object moved by embodiments of the invention is not required to follow the exact vertical Z-axis and the path between support structures of an object may or may not follow the exact horizontal Y-axis as the object is moved when the amount of rope in the system is kept constant. In general, on a first order approximation, for a given amount of rope injected into the system, the path between support structures of an object being moved by embodiments of the invention is that portion of an ellipse lying beneath and between the support structures. With more rope in the system, the path between support structures followed by an object becomes more circular or dipped in the middle. FIG. 2 shows this characteristic of the system. When the amount of rope in the system keeps the platform on a line between the tops of the two support structures, then the path between the support structures is a very flat ellipse approximating a line. When the amount of rope to an object is the same from each support structure, then the upward and downward path of an object follows the Z-axis if the heights of the two support structures are the same. Upward and downward motion of an object when the amount of rope to an object from each support structure is greater on one side than the other does not follow a linear path parallel to the Z-axis but rather is curved down and toward the closest support structure. Even though the motion of the object moved by embodiments of the invention is not required to be linear, it is much simpler to describe the invention in terms of Z movement related elements and Y movement related elements since the primary component of movement for these elements is along the respective axis, albeit at times slightly curved.

Embodiments of the invention move objects through two-dimensions using one rope. The rope is coupled with opposing sides of a platform and either attaches to the platform or to a Z movement device. The rope is driven by a motor and pulls the platform which may comprise an object from one side of the Y-axis to the other. The Z movement device displaces the rope to or from the system in order to move the object primarily in the Z-axis. The Z movement device may be a lever, a screw-drive, block and tackle, or any other mechanism which can be configured to displace rope. A motor driving the rope may comprise a stepping motor or standard motor with a brake system in order to lock motion when the motor has stopped rotating. Any type of device that can move rope can be used in place of a motor. There is no need for a complex computer control system since the Z-axis displacement is substantially independent of Y axis movement over a coverage area meaning that as the platform carrying the platform moves to the middle of the area of coverage in Y space, the Z-axis displacement is the deepest, see FIG. 2 path 200. As the platform moves towards a support structure, the Z-axis displacement is the highest. This gradual displacement in the middle of the coverage area makes embodiments well suited for various uses including but not limited to filming use, stadium use and strip mining use and provides a built in safety measure since the system naturally follows an elliptical path with foci centered at the support structures that can be as flat or circular as desired. In addition, by feeding rope with the Z movement device into the Y-axis rope, the platform can be moved horizontally while maintaining a constant Z-axis elevation. This can be accomplished manually or with a simple controller. In addition, since the ropes may be commanded from one point, distantly located motors and electrical cables may be utilized but are not required. Many types of useful objects or devices may then be attached to the platform including devices that require external power or devices that possess their own power and are operated via wireless signals. For instance, it is possible to attach a camera or any other useful type of equipment to the platform.

Figure 1:
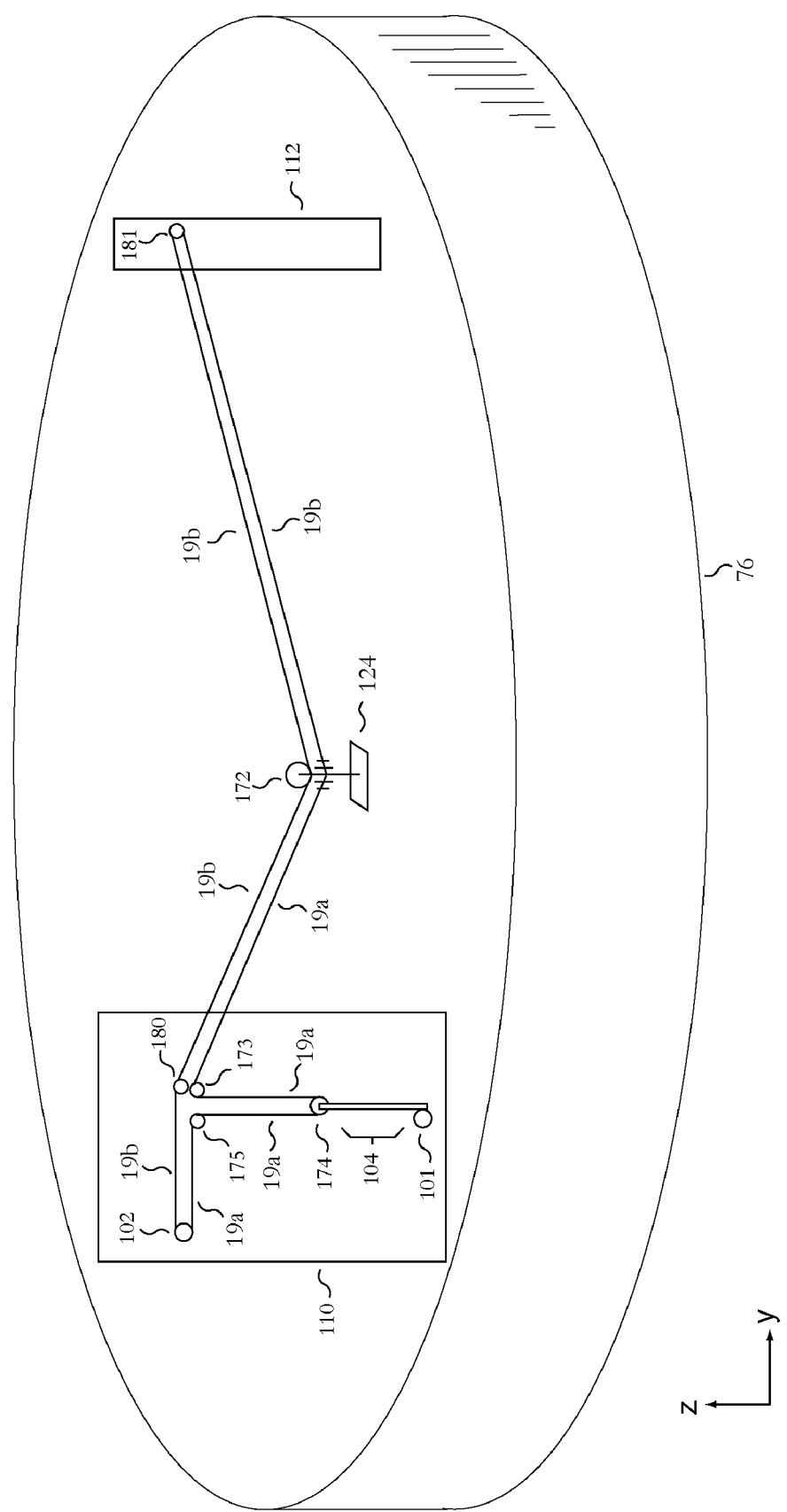
FIG. 1 shows a perspective view of an embodiment of the invention.

FIG. 1 shows a perspective view of an embodiment of the system. This embodiment is mounted in stadium 76. The two axes are shown in the figure with the Y-axis shown left to right and the Z-axis shown bottom to top of the page. In this configuration, support structures 110 and 112 separate platform 124 from the ground. Platform 124 provides a mobile attachment point for an object to be moved including but not limited to cameras, mining scoops, logging hooks, or any other utility enabling device applicable to any industry.

Platform 124 is supported and is moved in two dimensions by one rope. The rope forms a "V" shape when viewed from the perspective of FIG. 1. By decreasing the length of the rope deployed into the system via Z-axis motor 101 and Z movement device 104, platform 124 is raised. Conversely, increasing the length of the rope deployed, platform 124 is lowered. YZ movement rope sides 19a and 19b are different sides of the same piece of rope. Control of Y and Z-axis motors can be in the form of simple switches, potentiometers, or an optional but not required computer control system 1.

Z movement device 104 is coupled with YZ movement rope side 19a. Sheave 172 rides on YZ movement rope side 19b. By rotating Y-axis motor 102 (attached to a bull wheel that drives the rope but is not shown for ease of viewing), thereby decreasing the amount of rope on YZ movement rope side 19a, which increases the amount of rope on Y movement side 19b, the platform moves mainly in the negative Y direction, or to the left as shown in the figure.

Z movement device 104 can be any mechanism which can displace sheave 174 and is not required to be a rope, but rather can be a screw drive, hydraulic system, fulcrum or any other device capable of moving sheave 174. Z movement motor 101 may be utilized to power any type of Z movement device desired. Y-axis motor 102 drive pulley is not shown for ease of illustration. Drive pulleys and drum winches are well known to those skilled in the art and embodiments that minimize rope wear and provide anti-derailing features may be interchanged to drive the rope in the system. Any device that can pull move rope through it can be used in place of a drive pulley or bull wheel.

An embodiment of the invention can run fiber optics cables or power cables along YZ movement rope side 19a or 19b from support structure 110 to platform 124. Support structure 112 can alternatively supply power to the platform in the same manner. Platform 124 may alternatively house devices with collocated power supplies negating the need for external power cables. Devices attached to platform 124 may include wireless or other remote controlled devices.

Note that Z movement device 104 can comprise a sequence of pulleys for multiplying the Z-axis traversal, and may also utilize a block or other device for disabling travel in case of breakage within Z movement device 104. By placing a backup means of limiting the upward travel of sheave 174, the platform can be configured to never reach the ground beneath it even if a failure at or beneath Z movement device 104 were to occur.

FIG. 2 shows a YZ-axis reeving diagram for an embodiment of the invention employing distantly located winches for Y and Z-axis movement and shows two horizontal paths of motion depending on the height of the platform. FIG. 2 shows path 200 that the platform travels when rotating Y-axis motor 102 without asserting Z movement device 104. Note that this elliptical path would be deeper and more circular as seen in FIG. 2 path 201 if more rope was injected into the system via Z movement device 104. Note that even though the Y-axis motor rotation produces a path that slightly varies in Z-axis height, this displacement is minimal and therefore does not require a computerized control system or any control system for that matter. In this regard is the path were required to maintain a constant height in Z-axis direction over the course of travel, an operator could simply activate Z movement device 104 in order to inject a small amount of rope into the system as platform 124 towards either support structure holding sheaves 171 and 173 for example. Alternatively, a control system could be employed in order to do this automatically, but is in no way required.

Y movement in the positive Y direction, to the right in the figure, is accomplished by rotating Y-axis motor 102 counter-clockwise in the diagram. As Y-axis motor 102 rotates counter-clockwise, rope side 19b moves down from sheave 171 that is coupled with support structure 110 (not shown for ease of illustration) and from sheaves 172, 173, 174, 175. This pulls platform 124 to the right in the figure, in the positive Y-axis. As rope side 19b travels upward from Y-axis motor 102, rope side 19a heads up to sheave 176 and to platform 124. The one rope in the invention is designated with two reference characters 19a and 19b to signify which side of the platform the rope is connected to. The arbitrary dividing point for the designation is at Y-axis motor 102. Note that sheaves 171, 176, 173 and 175 may be eliminated in embodiments of the invention that utilize motors mounted in supports 110 and/or 112. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Retracting Z movement device 104 raises platform 124 primarily in the vertical direction and visa versa. As Z movement device 104 extends, YZ movement rope side 19b moves upward into sheaves 173 and 175 that are coupled with support structure 112 (again not shown for ease of illustration). Since both sides of platform 124 have increased rope length, the platform lowers. Motion of the Z movement device in the opposite direction raises the platform.

Figure 3:
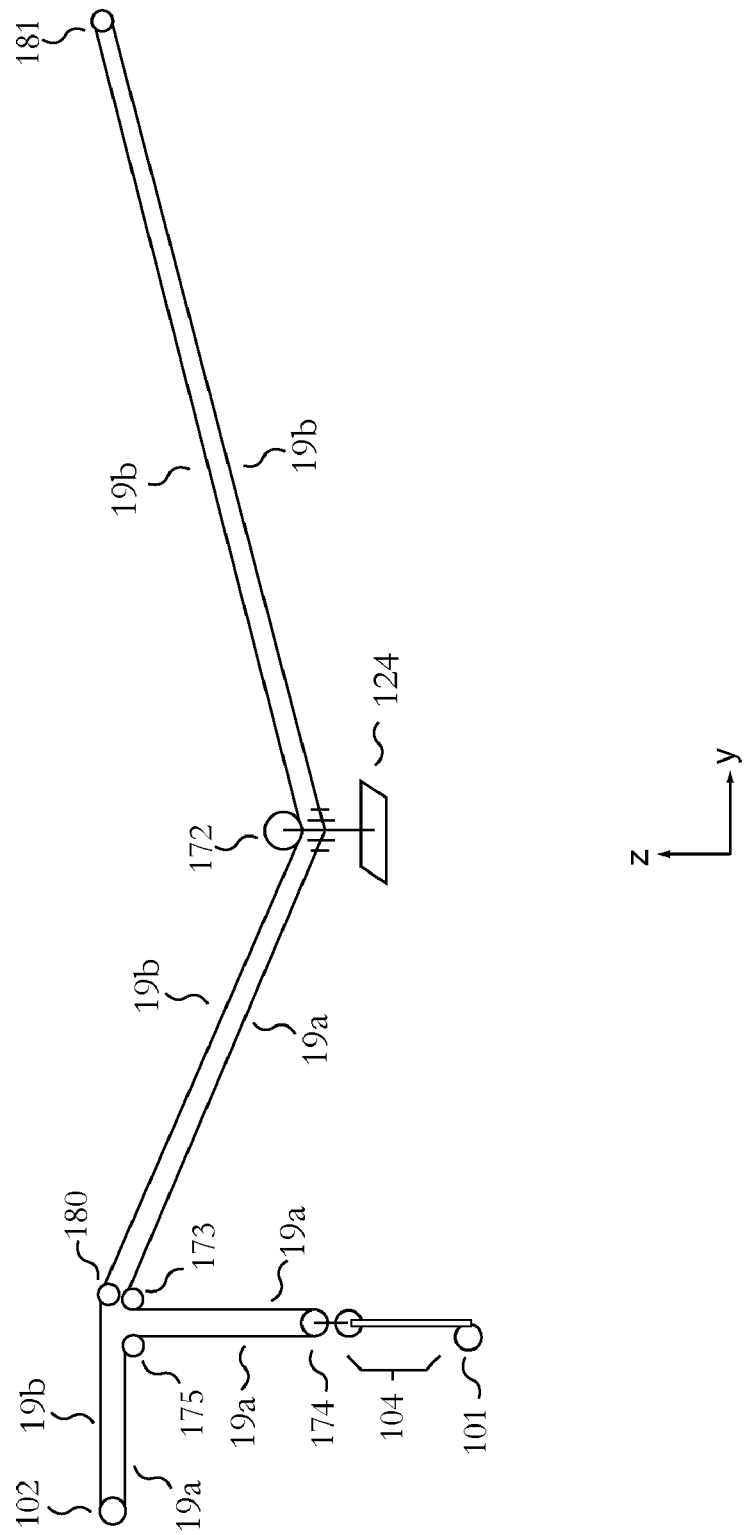
FIG. 3 is a YZ-axis reeving diagram for an embodiment of the invention employing Y and Z-axis movement devices on the same side of the invention.

FIG. 3 shows a YZ-axis reeving diagram for an embodiment of the invention employing Y and Z-axis movement devices on the same side of the invention. Y movement in the positive Y direction, to the right in the figure, is accomplished by rotating Y-axis motor 102 counter-clockwise in the diagram. As Y-axis motor 102 rotates counter-clockwise, rope side 19b moves into Y-axis bull wheel (not shown for ease of illustration) through sheaves 180, 172, 181. This pulls platform 124 to the right in the figure, in the positive Y-axis. As rope side 19a travels out of Y-axis motor 102, rope side 19a heads to sheave 175, 174, 173 and then to platform 124. The single rope in the system is designated with two reference characters 19a and 19b to signify which side of the platform the rope is connected to. The arbitrary dividing point for the designation is at Y-axis motor 102. Note that sheave 180 may be eliminated in embodiments of the invention that utilize a Y-axis motor mounted in high enough in support 110 (not shown for ease of illustration) to clear sheaves 173 and 175. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Retracting Z movement device 104 raises platform 124 primarily in the vertical direction and visa versa. As Z movement device 104 extends, YZ movement rope side 19a moves upward into sheave 173. The rope does not move into sheave 175 since the next span is to Y-axis motor 102 which is not a free rotating sheave. As rope moves to platform 124 from sheave 173, downward force from platform 124 on sheave 172 pulls rope side 19b from platform 124 into sheave 181 and through sheave 172. Since both sides of platform 124 have increased rope length, the platform lowers. Motion of the Z movement device in the opposite direction raises the platform.

Figure 4:
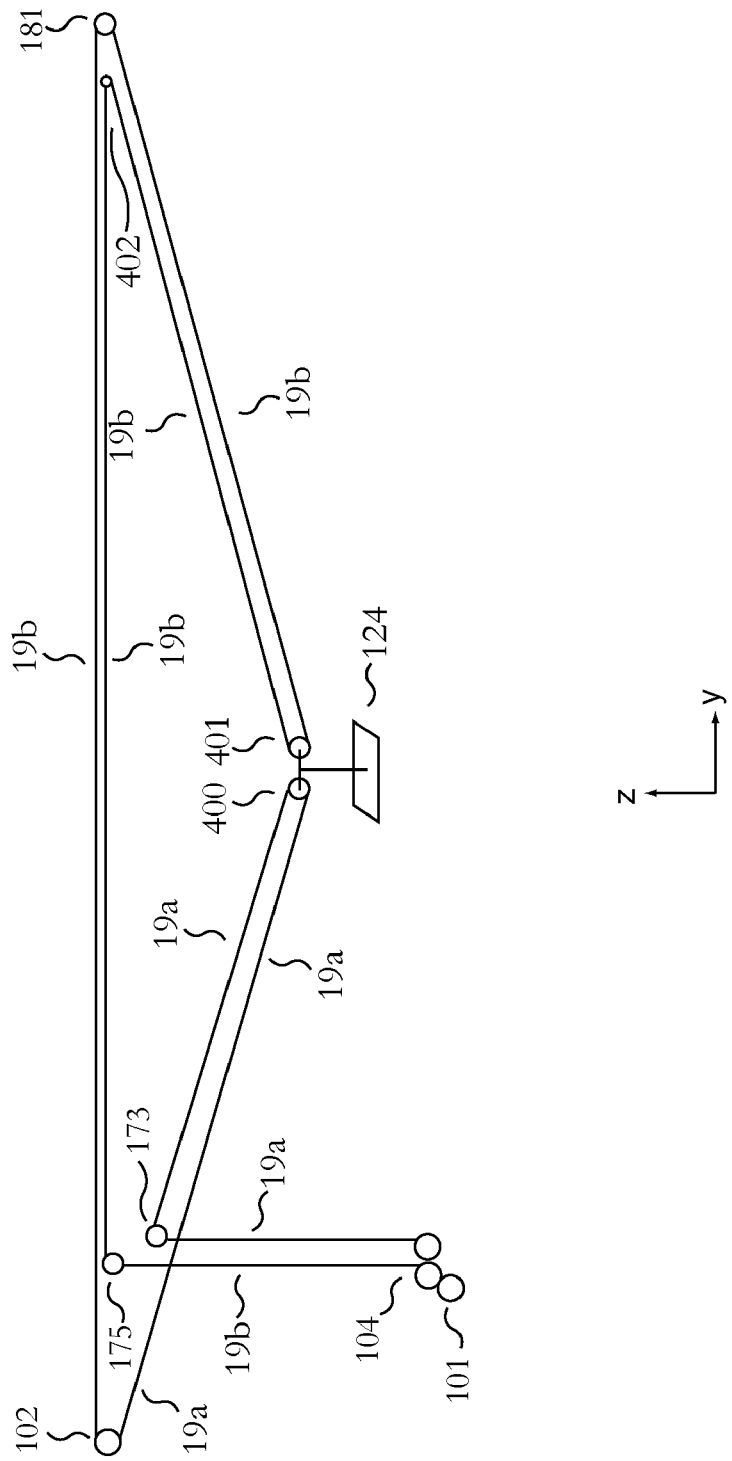
FIG. 4 shows the YZ-axis reeving diagram for an embodiment of the invention employing rope that is configured with attachment point at Z movement device as opposed to attachment at the platform.

FIG. 4 shows a YZ-axis reeving diagram for an embodiment of the invention employing rope that is configured with attachment point at Z movement device as opposed to attachment at the platform. Y movement in the positive Y direction, to the right in the figure, is accomplished by rotating Y-axis motor 102 counter-clockwise in the diagram. As Y-axis motor 102 rotates counter-clockwise, rope side 19b moves into Y-axis bull wheel (not shown for ease of illustration) coupled with Y-axis motor 102 through sheaves 181, 401, 402, 175. As rope side 19b leaves Y-axis bull wheel attached to Y-axis motor 102, it becomes designated rope side 19a. Rope side 19a travels into sheave 400 to sheave 173. This motion of the single rope in the system pulls platform 124 to the right in the figure, in the positive Y-axis. The arbitrary dividing point for the designation change from 19a to 19b on the two sides of the rope is at the Y-axis motor and runs on each side of that dividing point to the endpoints of the rope at Z movement device 104. Z movement device 104 in this embodiment is a two wheel winch, however any device can be used that is configured to deploy and remove lengths of rope sides 19a and 19b into the system. One skilled in the art will recognize that some sheaves may be moved or eliminated while keeping with the spirit of the invention. Reversing the direction of Y-axis motor 102 pulls platform 124 in the negative Y-axis direction, to the left in the diagram.

Rotating Z-axis motor 101 which in turn rotates this embodiment of Z movement device 104 (here a two wheel winch), causes an increase the length of deployed rope in the system on rope sides 19a and 19b lowers the platform in the Z-axis direction. As Z movement device 104 rotates in one direction, YZ movement ropes 19a and 19b move upward into sheave 173 and 175 respectively. Sheaves 173 and 175 may be coupled with support structure 110 (not shown for simplicity). As rope moves to platform 124 from sheave 173 into sheave 400, and from sheave 175 to sheave 402 and into sheave 401, both sides of platform 124 have increased rope length, and hence the platform lowers. Operating the Z movement device in the opposite direction raises the platform.

Figure 5:
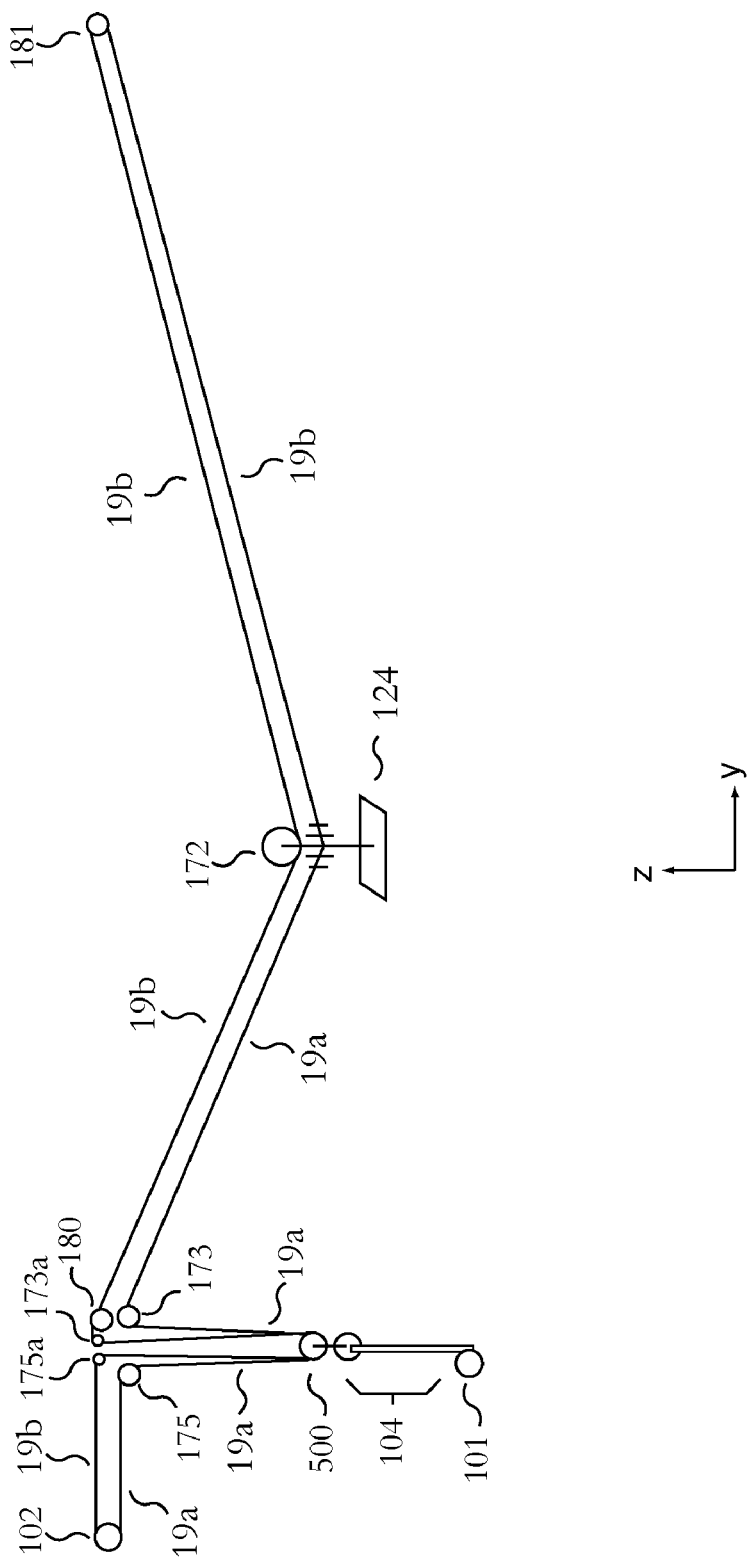
FIG. 5 is a YZ-axis reeving diagram for an embodiment of the invention employing dual Z-axis displacement.

FIG. 5 shows the YZ-axis reeving diagram for an embodiment of the invention employing dual Z-axis displacement devices. Y movement in the positive Y direction, to the right in the figure, is accomplished by rotating Y-axis motor 102 counter-clockwise in the diagram. The difference between this embodiment and the embodiment shown in FIG. 3 is 175a and 173a which operate on rope side 19b exactly in the same manner as sheaves 175 and 173 operate on rope side 19a. In addition, sheave 500 may be a double sheave comprising two separate sheaves. As Y-axis motor 102 rotates counter-clockwise, rope side 19b moves into Y-axis bull wheel attached to Y-axis motor 102 through sheaves 175a, 500 (first sheave), 173a, 180, 172 and 181. This pulls platform 124 to the right in the figure, in the positive Y-axis. As rope side 19a travels out of Y-axis motor 102, rope side 19a heads to sheave 175, 500 (second sheave), 173 and then to platform 124 where the termination is shown as broken vertical lines (also shown in the close up view in FIG. 6, terminators 600). The one rope is designated with two reference characters 19a and 19b to signify which side of the platform the rope is connected to. The arbitrary dividing point for the designation is at Y-axis motor 102. Note that sheave 180 may be eliminated in embodiments of the invention that utilize a Y-axis motor mounted in high enough in support 110 to clear sheaves 173, 173a, 175 and 175a. Support 110 may house all sheaves to the left of platform 124 in the figure, but is not shown for ease of viewing. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Extending Z movement device 104 vertically increases the length of deployed rope in YZ movement rope side 19a and 19b. This lowers the platform in the Z-axis direction. As Z movement device 104 increases in length, for example in the case of a screw block where a large screw rotates which unwinds a threaded block causing the block to rise, YZ movement rope side 19a moves upward into sheave 173 while at the same time rope side 19b moves upward into sheave 173a. The rope does not move into sheave 175 or 175a since the next span is to Y-axis motor 102 which is not a free rotating sheave. As rope moves to platform 124 from sheave 173, and 173a and 180, the platform lowers. Motion of the Z movement device in the opposite direction raises the platform.

Embodiments of the invention may comprise support structure 110 and 112 which may or may not comprise two sheaves each. Stadiums may contain support points, poles or other structures which may eliminate the need for separate support structures 110 and 112. More sheaves may be added to embodiments of the invention that require routing of rope through obstacles. Any of the sheaves utilized in the system may comprise any device that can guide the rope into the sheave securely.

Figure 6:
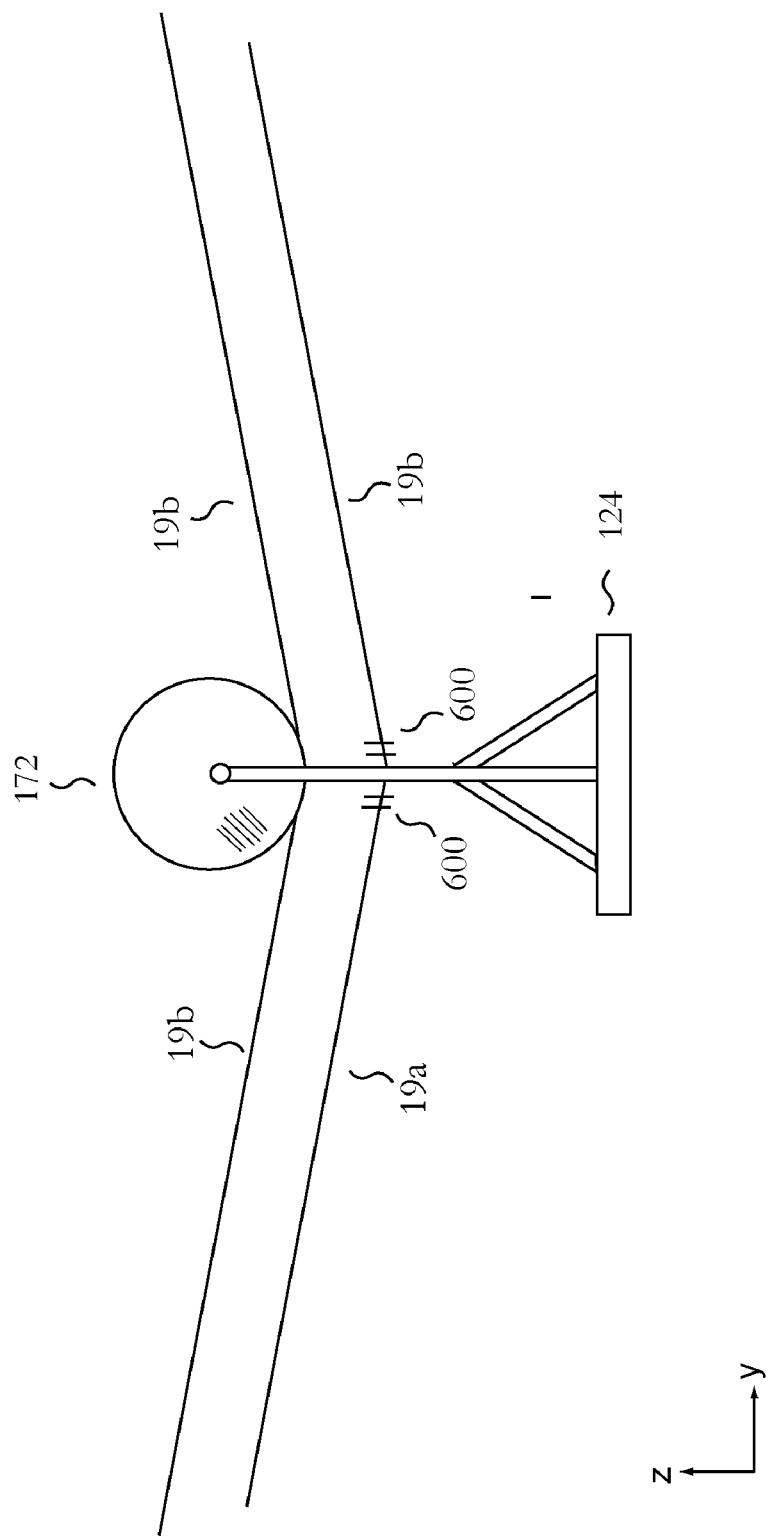
FIG. 6 is a perspective view of an embodiment of the platform.
Figure 7:
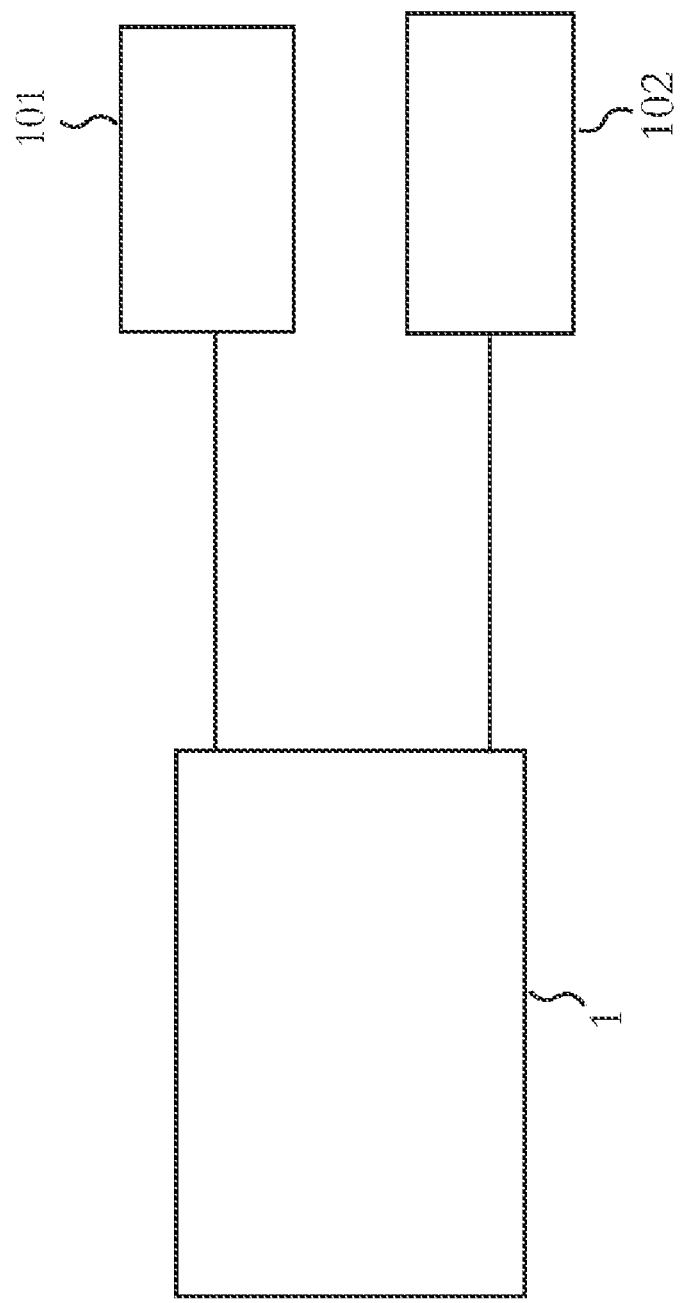
FIG. 7 is a schematic of a control system.

FIG. 6 shows close up perspective of platform 124 in one embodiment of the invention. This embodiment of the platform is suspended from rope side 19b via sheave 172. Any useful object or device may be mounted on the platform. Terminators 600 connect the rope ends to the platform.

FIG. 1 shows an embodiment of the invention that uses single sheaves at all rope direction points. Other embodiments may use multiple sheave arrangements virtually anywhere where a single sheave is used in order to change direction of a rope and further prevent derailing. Sheaves with groove shapes and rounded edges that minimize the lateral friction on ropes passing through the sheaves may be utilized in order to minimize the amount of wasted power in the system. Embodiments of the invention may use any type of sheave that works with the rope specified for the system. Any linear connection device may be utilized in place of rope, such as but not limited to cable. A dynamometer may be inserted in-line between Z-axis motor 101 and Z movement device 104 in order to provide tension readings.

An embodiment of the invention comprises a simple block and tackle utilized with the Z movement device 104. A block and tackle may be utilized in order to provide a Z-axis N-factor multiplier. Block and tackle assemblies are well known in the art and could readily be applied between Z movement device 104 and sheaves 173 and 175 in FIG. 3 in order to multiply the amount of rope injected into the system per unit of extension of Z movement device.

Platform 124 can have many different apparatus attached to it to perform a variety of functions including but not limited to stabilization devices, gimbals, camera equipment, mining loaders, ship-to-ship loaders, logging devices, ski lift seats, gondolas, body sensing flight simulator suits for allowing a person to simulate flying, reduced gravity simulator suits, lifting harnesses, munitions depot bomb retrievers, digital video equipment for security checks in railroad yards or nuclear facilities, robotic agricultural harvest pickers for quickly picking and storing grapes or other produce or any other device that benefits from repeatable placement and motion in two dimensional space. In another embodiment, platform 124 comprises a witness camera mounted pointing down from the platform, providing a picture from the viewpoint of the platform.

What is claimed is:

1. A system comprising:
   a platform coupled with two freely rotating sheaves each coupled to opposing sides of said platform wherein no sheave coupled with said platform is coupled with a brake;
   a YZ movement rope configured to move said platform;
   a Z movement device configured to move said YZ movement rope;
   a Y movement motor coupled with said YZ movement rope;
   a Z movement motor coupled with said Z movement device;
   said YZ movement rope being a single rope that has two ends attached to the Z movement device; and
   a computer coupled with said Y movement motor and said Z movement motor and configured to control said YZ movement rope to move said platform in a Y axis and a Z axis via said YZ movement rope.

2. The system of claim 1 further comprising at least two support structures.

3. A method comprising:
   coupling a YZ movement rope with two freely rotating sheaves each coupled to opposing sides of a platform wherein no sheave coupled with said platform is coupled with a brake;
   coupling a Z movement device to said YZ movement rope;
   coupling said YZ movement rope to a Y movement motor;
   coupling said Z movement device to a Z movement motor;
   providing said YZ movement rope as a single rope that has two ends attached to the Z movement device;
   coupling a computer with said Y movement motor and said Z movement motor; and,
   controlling said YZ movement rope in a Y axis and a Z axis with said computer by rotating said Y movement motor and rotating said Z movement motor in order to move said platform via said YZ movement rope.

4. A system comprising:
   means for coupling a YZ movement rope with two freely rotating sheaves each coupled to opposing sides of a platform wherein no sheave coupled with said platform is coupled with a brake;
   means for coupling a Z movement device to said YZ movement rope;
   means for coupling said YZ movement rope to a Y movement motor;
   means for coupling said Z movement device to a Z movement motor, and said YZ movement rope being a single rope that has two ends attached to the Z movement device;
   means for coupling a computer with said Y movement motor and said Z movement motor, said computer coupled to rotate said Y movement motor and rotate said Z movement motor in order to move said platform via said YZ movement rope; and wherein, all of said means for coupling, said sheaves, said YZ movement rope, said Z movement device, said Z movement motor, said Y movement motor, and said computer form parts of said system.

* * * * *